United States Patent [19]
Tanaka

[11] 4,107,715
[45] Aug. 15, 1978

[54] FILMSTRIP METERING DEVICE FOR A CAMERA

[75] Inventor: Harumi Tanaka, Kobe, Japan

[73] Assignee: Minolta Camera Kabushiki Kaisha, Osaka, Japan

[21] Appl. No.: 839,814

[22] Filed: Oct. 6, 1977

Related U.S. Application Data

[63] Continuation of Ser. No. 716,232, Aug. 20, 1976, abandoned.

[30] Foreign Application Priority Data

Aug. 21, 1975 [JP] Japan .................. 50-114328[U]

[51] Int. Cl.$^2$ .................................. G03B 17/42
[52] U.S. Cl. .............................. 354/206; 354/213
[58] Field of Search ................. 354/206, 207, 213

[56] References Cited

U.S. PATENT DOCUMENTS

| | | | |
|---|---|---|---|
| 3,820,142 | 6/1974 | Beach | 354/206 |
| 3,829,875 | 8/1974 | Winkler et al. | 354/206 |
| 4,009,478 | 2/1977 | Yamashita | 354/206 |

Primary Examiner—L. T. Hix
Assistant Examiner—M. L. Gellner
Attorney, Agent, or Firm—Watson, Cole, Grindle & Watson

[57] ABSTRACT

A camera has a device for metering a filmstrip having a filmstrip metering perforation in each frame thereof, the filmstrip being locked for each frame by moving a sensing member provided on the camera body into engagement with the filmstrip metering perforation. Transmission members, adapted to transmit the movement of a wind-up member to a filmstrip winding shaft so as to wind the filmstrip therearound, cease transmission in association with the engagement of the sensing member with the filmstrip metering perforation for stopping the winding of the filmstrip, and transmit the movement of wind-up member to the filmstrip winding shaft in association with the operation of a resetting member to disengage the sensing member from the filmstrip metering perforation in the initial phase of operation of the wind-up member, after the shutter has been released.

11 Claims, 4 Drawing Figures

FILMSTRIP METERING DEVICE FOR A CAMERA

This is a continuation of application Ser. No. 716,232, filed Aug. 20, 1976, now abandoned.

BACKGROUND OF THE INVENTION

This invention relates generally to a filmstrip metering device adapted to lock a filmstrip after one frame thereof has been wound due to the operation of a wind-up member, and more particularly to such a device for metering a filmstrip having each frame thereof provided with a single metering perforation with a sensing member being engageable with a filmstrip metering perforation, the wind-up member being provided on a side of a camera body.

With a camera of this type, the winding of one frame of a filmstrip and the cocking of the shutter are both effected by operating the filmstrip wind-up member. When one frame of a filmstrip has just been wound, the filmstrip has to be locked so as to interrupt its winding around a shaft.

Filmstrip metering devices for use in a camera of this type are classified into three categories:

(1) When a filmstrip has been wound a given length, the movement of a wind-up member or the movement of a member associated therewith is forcibly interrupted. (See U.S. Pat. No. 3,820,142)

(2) When a filmstrip has been wound a given length, a transmission mechanism then disposed between a filmstrip winding shaft and a filmstrip wind-up member is interrupted. (See U.S. Pat. No. 3,829,975)

(3) A clutch mechanism is disposed between a filmstrip wind-up member and a transmission member adapted to transmit the movement of the filmstrip wind-up member to a filmstrip winding shaft, while a meshing engagement between the filmstrip wind-up member and the transmission member is released by means of the clutch mechanism, when a given length of a filmstrip is wound.

However, the approach according to category (1) requires that a cocking operation of the shutter be completed simultaneously with the completion of winding one frame of the filmstrip by the operation of the filmstrip wind-up member, with the result that the length of a filmstrip to be fed until the completion of cocking of the shutter is progressively increased, depending on the length of the filmstrip wound about a filmstrip winding shaft, thus providing varying spacings between each two frames of a filmstrip.

The approach according to category (2) requires the use of planetary gears of a complicated construction in a transmission member. This leads to a complicated construction of a filmstrip metering device, and hence highly accurate members or parts must be provided, with a resulting increase in cost.

The category (3) approach uses a clutch mechanism, such that when gears of a transmission member mesh with gears of a film wind-up member by means of the clutch mechanism, a high winding load is directly applied to transmission gears, with the resulting incomplete meshing between gears. As a result, a filmstrip is wound, with edges of teeth of one gear being urged against edges of teeth of another gear.

OBJECTS OF THE INVENTION

It is an object of the present invention to provide a filmstrip metering device for use in a camera, which device avoids the shortcomings experienced with the prior art devices of this type.

It is another object of the present invention to provide a filmstrip metering device of the type described wherein, when a filmstrip is wound a given length, a sensing member then locks the filmstrip so as to interrupt the travel thereof, while exertion of an excessively high load on the filmstrip is avoided, upon interruption of the winding thereof.

It is a further object of the present invention to provide a filmstrip metering device for use in a camera which may accurately meter a given length of a filmstrip, when the filmstrip is released from its locked condition by means of the sensing member permitting the filmstrip to be wound again.

It is a still further object of the present invention to provide a filmstrip metering device for use in a camera, in which the operation of a wind-up member for driving a filmstrip is interrupted by releasing a clutch mechanism including transmission gears and a rack gear on the wind-up member, in association with an operation to stop movement of the filmstrip as a sensing member engages a filmstrip metering perforation, the transmission mechanism being adapted to transmit the movement of the wind-up member to a filmstrip winding shaft.

It is a yet further object of the present invention to provide a filmstrip metering device for use in a camera, in which a resetting member releases the sensing member from its engagement with a filmstrip metering perforation in the initial phase of the filmstrip winding operation, and the clutch mechanism is brought into an engaging condition again.

It is a further object of the present invention to provide a filmstrip metering device for use in a camera, in which the clutch mechanism may be brought into an engaging condition again, as the wind-up member meshes with a transmission gear, while exertion of a winding load on the transmission gears is initially prevented during the meshing phase of the wind-up member with the transmission gear, thereby insuring smooth but positive operation of the clutch mechanism.

These and other objects and features of the present invention will become more apparent from the following description of the invention when taken in conjunction with the accompanying drawings.

SUMMARY OF THE INVENTION

According to the present invention, a filmstrip metering device is provided for use in a camera and most nearly falls into the aforedescribed category (3). Each frame of the filmstrip has a single filmstrip metering perforation, and a sensing member is movably provided on the camera body and is engageable with a filmstrip metering perforation. A filmstrip winding shaft is driven by the operation of a wind-up member through the medium of transmission means having a clutch mechanism which causes meshing of a rack gear of the wind-up member with the transmission means. Accordingly, the sensing member senses a filmstrip metering perforation in the filmstrip which is being moved by the rotation of the filmstrip winding shaft, and engages a filmstrip metering perforation, with the result that the sensing member is moved relative to the camera body. The clutch mechanism is disengaged in association with the operation of the sensing member to lock the film; and a resetting member, adapted to be operated by the wind-up member in the initial phase of the winding operation of the filmstrip, releases the sensing member from engagement with the filmstrip metering perforation so as to reset the sensing member in its initial position, so that the clutch mechanism is brought into an engageable condition again.

Accordingly, the filmstrip is driven through the medium of the clutch mechanism adapted to be brought into an engaging condition due to the operation of the filmstrip wind-up member. The filmstrip is locked as the sensing member engages a filmstrip metering perforation, whereby an engaging condition of the clutch mechanism is released, thereby preventing the filmstrip from being continuously driven due to a subsequent winding operation. As a result, cocking of the shutter may be effected due to a subsequent winding operation in a manner that the sensing member will not exert an excessive load on the filmstrip. In addition, the spacings of each frame of the filmstrip being fed may be maintained constant. Furthermore, the clutch mechanism may be brought into an engaging condition again in association with the operation of a resetting member to release the sensing member from engagement with a filmstrip metering perforation due to the subsequent winding operation after taking a picture. the re-engagement of the clutch mechanism is effected due to the meshing of the first gear included in the transmission means with the wind-up member. However, in the initial phase of the meshing operation, the first gear positively engages the filmstrip wind-up member and a second gear under the action of a weak spring as well as due to the rotation of itself, thereby rotating the second gear in a manner that the second gear will move along the periphery of an intermediate gear meshing with the second gear. Due to such turning motion of the second gear, a first lever which has been pivotally supported by a shaft of the first gear and a shaft of the second gear rotates about the center of rotation of the first gear, while a second lever pivotally supported by the shaft of the second gear and a shaft of the intermediate gear rotates about the center of rotation of the intermediate gear, with the result that the first lever engages a stopper, while the second lever engages a locking member cooperative with the sensing member.

As a result, the respective centers of rotation of the first and second gears are rigidly fixed, whereupon the filmstrip wind-up member completely meshes with the first gear. Accordingly, a winding load is applied to the first gear, so that the filmstrip begins to be wound about a winding shaft through the medium of the first and second gears and the intermediate gear. More particularly, in the initial phase of the meshing operation of the wind-up member with the first gear, no winding load is applied to the first gear, so that the first gear may smoothly but positively mesh with the wind-up member, thus avoiding the danger of the filmstrip being wound under an incomplete meshing condition of the both members.

BRIEF DESCRIPTION OF THE DRAWINGS

The drawings are top plan views of an essential portion of one embodiment of the invention, wherein.

DESCRIPTION OF THE PREFERRED EMBODIMENT

Figure 1:
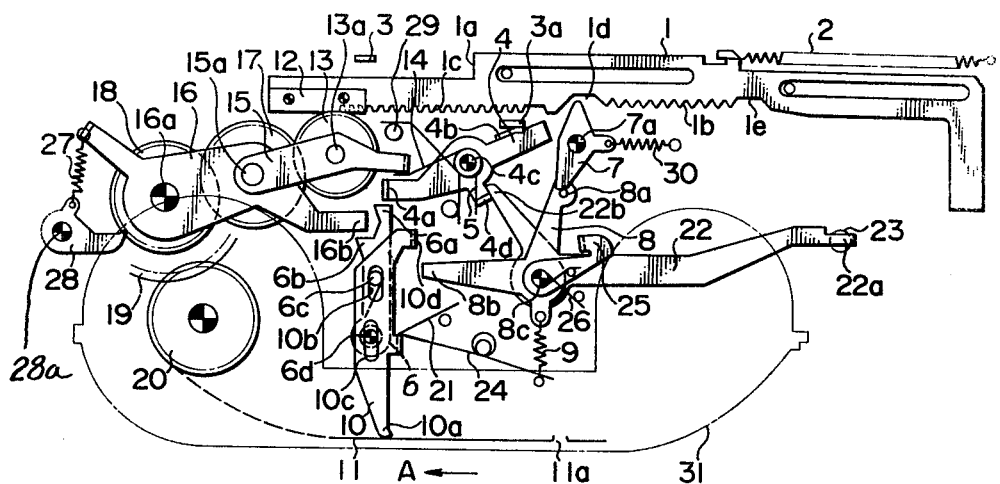
FIG. 1 illustrates a condition wherein a sensing member has been reset immediately before the commencement of a filmstrip winding operation.

Referring to FIG. 1, a wind-up member 1 is reciprocally mounted on the camera body (not illustrated for the sake of clarity) by a pin-in-slot arrangement. Member 1 is urged to the right, when viewing FIGS. 1 to 4, under the action of a spring 2 interconnecting a portion thereof with the camera body.

Rack teeth 1c are provided along an inner edge of member 1 and are adapted to mesh with the teeth of a first gear 13 forming an element of the transmission means to be described hereinafter. A shoulder portion 1a is provided on an opposite edge of member 1 and is adapted to engage a shutter cocking lever 3, disposed on the camera, in the course of the leftward movement of wind-up member 1. In addition, the wind-up member is formed with cutaway portions 1d, 1e which are adapted to rotate a return-movement-preventive lever 7 due to its engagement therewith, lever 7 being mounted on the camera body for pivotal movement about its shaft 7a, being connected to the camera body by means of a spring 30 for resiliently maintaining it in a neutral non-rotative position. And member 1 is formed with ratchet teeth 1b positioned between cutaway portions 1d and 1e which teeth are engageable with return-movement-preventing lever 7.

By reason of such ratchet teeth 1b, the wind-up member 1 may be prevented from returning to its initial position of FIG. 1 during its advance movement in the direction of arrow A, or may be prevented from advance during its return movement, respectively. The advance movement thereof may be switched to the return movement or the return movement may be switched to the advance movement, only when return-movement-preventive lever 7 extends into cutaway portions 1d or 1e at the end of the advance or return travel of the wind-up member.

A resetting lever 8 has a pin 8a mounted on an arm thereof which pin is engageable with return-movement-preventive lever 7, lever 8 being mounted on the camera body for pivotal movement about a shaft 8c. Resetting lever 8 is resiliently biased during its rotational movement by means of a spring 9 interconnecting it with the camera body. When pin 8a engages return-movement-preventing lever 7, resetting lever 8 is rotated from its position of rest of FIG. 1 against the force of spring 9.

First gear 13 is mounted for rotation about a shaft 13a and is adapted to mesh with rack gear teeth 1c on the wind-up member so as to be driven by member 1. The rotation of first gear 13 is transmitted through the medium of a second gear 17, an intermediate gear 18 and wind-up gear-engaging gear 19 to a filmstrip wind-up gear 20 rotatably mounted on a filmstrip cartridge 31 shown in phantom outline and being inserted into the camera body.

Gears 13, 17, 18, 19 constitute transmission members having intermeshing gear teeth thereon for transmitting rotation of gear 13 to that of gear 20 in a typical manner.

A first lever 15 is pivotally mounted on shaft 13a of the first gear as well as on a shaft 15a on which second gear 17 is mounted for rotation. First lever 15 is also pivotable relative to a second lever 16 mounted for pivotal movement about shaft 15a. Accordingly, as first lever 15 pivotally moves about shaft 15a, first gear 13 rotates along the periphery of second gear 17.

Second lever 16 is mounted for pivotal movement on the camera body by means of a shaft 16a, on which gears 18 and 19 are mounted for rotation. Second lever 16 is urged for rotation in a counterclockwise direction by means of a spring 27 positioned between the opposite end of the second lever and a return-movement-preventive pawl 28 pivotally mounted to the camera body by its shaft 28a. Thus, first lever 15 is urged for rotation in a counterclockwise direction in such a manner whereby first gear 13 may engage rack teeth 1c of wind-up member 1.

An operating lever 4 is rotatably supported on the camera body by means of a shaft 4c, and is urged for counterclockwise rotation by a spring 5 bearing against a pin on the camera body and against an arm 4d of the lever. Lever 4 also has a bent portion 4a engageable with the end of an arm 6a of a locking lever 6 to be described hereinafter, an inclined portion 4b engageable with a release sensor 3a connected to shutter cocking lever 3, bent portion or arm 4d being engageable with an end of arm 22b of a double-exposure-preventive lever 22 pivotally mounted on shaft 8c.

Locking lever 6 has a jaw portion 6b which is engageable with an end of arm 16b of second lever 16 to hold same. Lever 6 is mounted on the camera body for pivotal movement about a shaft 6d, and is urged for counterclockwise rotation by a spring 21 which bears against a pin 6c on lever 6 and against a pin on the camera body. Pin 6a and shaft 6d extend into guide slots 10b and 10c, respectively, which are provided in a sensing lever 10, so that lever 10 may slide relative to lever 6, and is rotatable together therewith. Sensing lever 10 is urged downwardly by a spring 24 bearing against a portion thereof and against a pin on the camera body, as shown, so that a lowermost sensing portion 10a thereof continuously abuts against a filmstrip 11 contained within film cartridge 31. A bent arm portion 10d, provided on sensing lever 10 at an opposite end thereof, is adapted to engage an arm 8b of resetting lever 8. A spring 9 interconnects a portion of lever 8 with the camera body so as to maintain the lever in a neutral position of rotation. Thus, when the resetting lever is rotated clockwise by return-movement-preventive lever 7 as pin 8a engages lever 7, arm 8b is rotated from its position of FIG. 1 into engagement with arm 10d, so that sensing lever 10 is moved upwardly against the action of spring 24. On the other hand, bent portion 10d is maintained out of engagement with arm 8b of lever 8, when sensing portion 10a engages a filmstrip metering perforation 11a provided for each frame of filmstrip 11.

As mentioned above, lever 22 is pivotally mounted on shaft 8c of resetting lever 8, and is urged by means of a spring (not shown) for counterclockwise rotation. Lever 22 has an arm 22b which is engageable with arm 4d of lever 4, and another arm 22a on an end opposite arm 22b, arm 22a being engageable with an end face of an axially movable release button shaft 23 provided on the camera. A lever 25 is pivotally mounted on shaft 8c and is urged for clockwise rotation by means of a spring 26 bearing against a pin on lever 25 and on the camera body, so as to abut lever 25 against cartridge 31. Therefore, when the cartridge is not loaded in the camera, lever 25 is rotated clockwise and bears against lever 22 by means of a bent portion provided on lever 25. Thus, lever 22 is rotated clockwise together therewith. As a result, arm 22a is retracted from a moving locus of release button shaft 23.

In operation, when wind-up member 1 is moved to the left against the action of spring 2, with sensing portion 10a being out of engagement with a filmstrip metering perforation 11a, shoulder portion 1a then moves shutter cocking lever 3 to the left from its position of FIG. 1 so as to cock the shutter. Release sensor 3a, which is connected to cocking lever 3, is likewise moved to the left away from its position abutting against inclined portion 4b, thereby permitting lever 4 to rotate counterclockwise under the action of spring 5. Simultaneously therewith, return-movement-preventive lever 7 is disengaged from cutaway portion 1d and is engaged with ratchet portion 1b. Accordingly, return-movement-preventive lever 7 is rotated counterclockwise against the action of spring 30, thereby urging pin 8a so as to rotate resetting lever 8 clockwise against the action of spring 9.

However, at this time, since sensing portion 10a of sensing lever 10 is merely abutting against filmstrip 11 without extending into a metering perforation 11a thereof, bent portion 10d is positioned out of a rotating locus of arm 8b of resetting lever 8.

Figure 4:
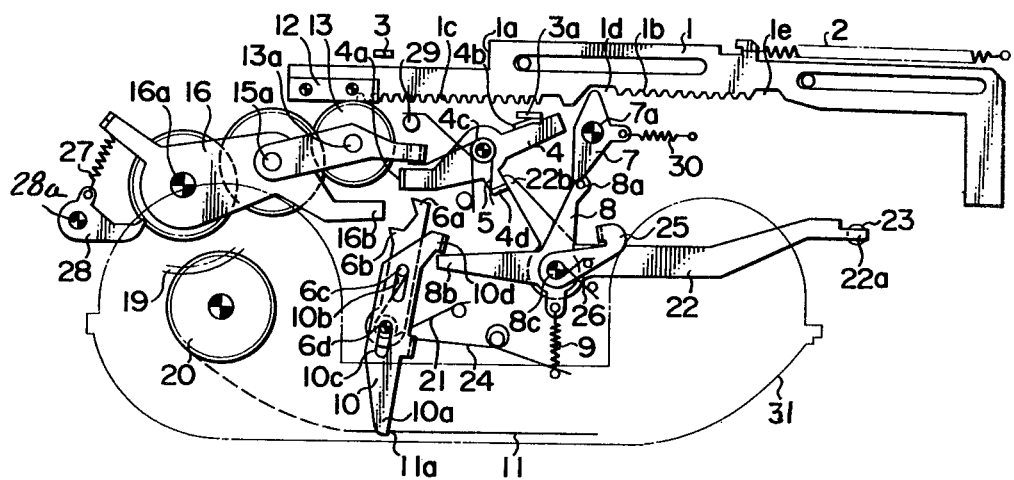
FIG. 4 indicates a condition where a shutter has been completed.

On the other hand, when wind-up member 1 is moved to the left from its position shown in FIG. 4, with the first metering of the filmstrip having been completed and sensing portion 10a of sensing lever 10 extending into a filmstrip metering perforation 11a, resetting lever 8 is rotated clockwise, so that arm 8b thereof engages bent portion 10d of sensing lever 10 so as to cause sensing portion 10a to be pulled outwardly of filmstrip metering perforation 11a, thereby releasing filmstrip 11 from its locked position by means of the sensing lever. Thereafter, sensing lever 10 is slightly rotated counterclockwise under the action of spring 21, so that sensing portion 10a abuts against a portion of filmstrip 11 which is spaced a small distance to the right of perforation 11a, into which the sensing portion 10a had extended. On the other hand, locking lever 6, together with sensing lever 10, is rotated counterclockwise, so that jaw portion 6b is brought into a position engageable with arm 16b of lever 16.

In either case, bent portion 4a of lever 4, when rotated counterclockwise, abuts against top end 6a of lever 6.

Figure 2:
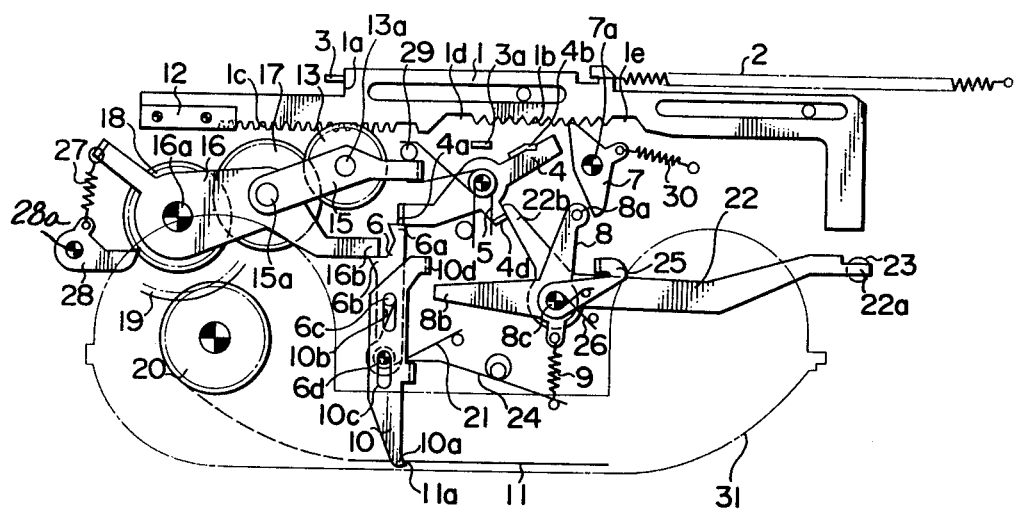
FIG. 2 shows a condition wherein a filmstrip is in the course of winding.

When the wind-up member is further moved to the left as in FIG. 2 during a condition when sensing lever 10 has been at rest, bent portion 4a of lever 4 abuts against top end 6a of locking lever 6, and arm 16b of second lever 16 engages jaw portion 6b of locking lever 6, then the shutter is moved to its cocked position. First gear 13 is brought into a positive meshing engagement with rack 1c of wind-up member 1 due to the leftward movement of member 1 under the action of a weak spring 14. First gear 13 is thereupon rotated counterclockwise during the leftward movement of wind-up member 1 and is firmly enmeshed with the teeth of rack 1c and of second gear 17 due to the force of spring 14 and its own rotation. Meanwhile, counterclockwise rotation of first gear 13 causes second gear 17 to rotate clockwise along the periphery of intermediate gear 18 while moving downwardly as in FIG. 3.

As a result, first lever 15 pivots counterclockwise about shaft 15a, while second lever 16 pivots clockwise about shaft 16a. At this time, since shaft 13a of first gear 13 is not rigidly mounted in place, it is freed from a winding load, thereby permitting a smooth meshing engagement with rack 1c.

First lever 15 and second lever 16, which pivotally move, then engage a stopper 29 on the camera body and jaw portion 6b of locking lever 6, so that the pivotal movements of the first and second levers are interrupted. As a result, shaft 13a of first gear 13 and shaft 15a of second gear 17 are firmly positioned, so that first gear 13 may mesh with rack 1c completely, and a winding load may be thereby exerted on first gear 13. At this time, the leftward movement of wind-up member 1 is transmitted by way of first gear 13, second gear 17, intermediate gear 18 and wind-gear-engaging gear 19 to filmstrip-wind gear 20 of cartridge 31, thereby starting the winding of the filmstrip. As a result, a filmstrip metering perforation 11a approaches sensing portion 10a for the reception thereof as shown in FIG. 2.

Figure 3:
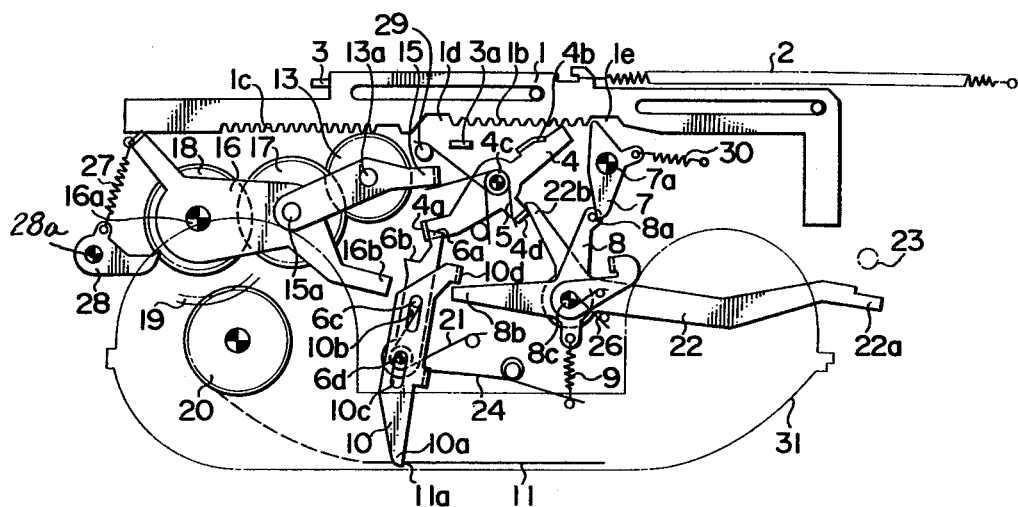
FIG. 3 indicates a condition wherein the aforesaid winding operation has been completed.

Accordingly, as the filmstrip travels in the direction of arrow A, sensing lever 10, together with locking lever 6, is rotated clockwise about shaft 6d, so that jaw portion 6b of locking lever 6 is disengaged from arm 16b of second lever 16. As shown in FIG. 3, jaw portion 6b of locking lever 6 is disengaged from arm 16b, the moment sensing lever 10 locks filmstrip 11. At this time, top end portion 6a of locking lever 6 engages bent portion 4a of lever 4, so that lever 4 is rotated clockwise and is held in such position. As a result, second lever 16 is rotated clockwise to a large extent, thereby releasing first gear 13 from its meshing engagement with rack 1c. Accordingly, filmstrip 11 is no longer driven by a subsequent winding operation, while the shutter may be cocked.

As has been described earlier, when shutter-cocking lever 3 is cocked during the filmstrip winding operation, whereby the lever 4 is rotated counterclockwise under the action of spring 5 in association with the aforesaid cocking operation, bent portion 4d then engages arm 22b of double-exposure-preventive lever 22 so as to rotate same clockwise, as shown in FIG. 3, whereupon arm 22a thereof is disengaged from release-button shaft 23, thus allowing the shutter to be released.

Upon completion of a winding operation, an arm of return-movement preventive lever 7 extends into cutaway portion 1e, so that lever 7 is rotated clockwise so as to release wind-up member 1 from its locked condition thereby permitting member 1 to be returned to its rest position to the right under the action of spring 2. At this time, second lever 16 is returned by spring 27 to its position where arm 16b engages jaw portion 6b of locking lever 6.

When release button shaft 23 is depressed, then the shutter, cocking lever 3 and release sensor 3a travel from the lefthand cocked positions to the righthand release positions, so that as shown in FIG. 4, release sensor 3a engages inclined surface 4b of lever 4, thereby rotating lever 4 clockwise. As a result, bent portion 4a releases top end 6a of locking lever 6 from its engaged condition, while bent portion 4d moves away from arm 22b of double-exposure-preventive lever 22, thereby allowing lever 22 to rotate counterclockwise under the action of a spring (not shown). Arm 22a of double-exposure-preventive lever 22 precludes the subsequent depression of release button shaft 23, thereby allowing a subsequent winding operation.

Meanwhile, when film cartridge 31 is not charged into the camera, detecting lever 25 rotates clockwise under the action of spring 26, thereby causing double-exposure-preventive lever 22 to rotate in the same direction against the action of its spring. As a result, arm 22a of double-exposure-preventive lever 22 is retraced from a locus of release button shaft 23, thereby allowing an advancing motion for the release button shaft 23. Without the provision of detecting lever 25, and when no film cartridge is charged into the camera, when wind-up member 1 is moved to the left and the shutter is cocked, the subsequent shutter releasing operation can then no longer be effected, since double-exposure-preventive lever 22 precludes a releasing operation of a shutter due to the advancing movement of release button shaft 23.

While the described embodiment represents the preferred form of the present invention, it is to be understood that modifications will occur to those skilled in the art without departing from the spirit of the invention. The scope of the invention is therefore to be determined solely by the appended claims.

What is claimed is:

1. A camera in which a film cartridge may be inserted, the cartridge containing a filmstrip wound about a film wind-up gear and having a single filmstrip metering perforation on each frame thereof, the camera comprising:
   a wind-up member mounted on the camera for movement between a rest and a winding position and having drive means thereon;
   means resiliently urging the wind-up member toward its rest position;
   transmission members for rotating the film wind-up gear on which the filmstrip is to be wound, said members including a rotatable first gear engageable with said drive means, a first lever pivotally mounted on said first gear, a wind-up engaging gear rotatable about a shaft mounted on the camera, said engaging gear being engageable with the film wind-up gear, a second lever being mounted on the camera for pivotal movement about said shaft, an intermediate gear mounted on said shaft for rotation together with said engaging gear, a second gear rotatably mounted on both said first and second levers and being in meshing engagement with both said first and said intermediate gears, said second lever being movable between a first position wherein said first gear engages said drive means and a second position wherein said first gear is disengaged from said drive means;
   a sensing lever movable from a retracted position abutting said filmstrip through an extended position engaging one of said film metering perforations and to a metering position pivoted a predetermined angle while engaging one of said film metering perforations as said film is wound up;
   means on the camera for resiliently urging said sensing lever toward said extended position;
   a locking lever mounted on the camera for movement between a first position bearing against said second lever for locking it in its first position and a second position out of bearing engagement with said second lever for releasing it from its locked condition; and
   means on the camera for resiliently urging said locking lever toward its first position, said locking lever being operatively coupled with said sensing member so as to be moved to its second position when said sensing member reaches said metering position.

2. The camera according to claim 10, further comprising:
- a shutter cocking lever disposed in the path of movement of said wind-up member so as to be moved from a release position to a cocked position as the wind-up member is moved to its winding position, said shutter cocking lever having a release sensor thereon disposed out of the path of movement of said wind-up member and being moved together with said shutter cocking lever;
- an operating lever being mounted on the camera for pivotal movement between first and second positions, said operating lever in its first position being in engagement with said release sensor while said shutter cocking lever is in its release position, said release sensor moving away from said operating lever when said shutter cocking lever is cocked thereby permitting said operating lever to move into its second position, said operating lever in its second position bearing against said locking lever for locking it in the second position thereof; and
- a resetting lever pivotally mounted on the camera for bearing against said sensing member for retracting said sensing portion thereof away from the filmstrip in an initial phase of operation of said wind-up member as it is moved from its rest to its winding position.

3. The camera according to claim 2, wherein said resetting lever is mounted for movement by said wind-up member so that, when said wind-up member is moved from its rest to its winding positions, said resetting lever is actuated so as to disengage said sensing portion from the filmstrip metering perforation and to permit said sensing lever to pivotally move from said metering position to said retracted position under the action of said means urging said sensing member, before said drive means starts a driving of said first gear.

4. The camera according to claim 2, wherein said drive means on said wind-up member comprises a rack gear, and wherein during movement of said wind-up member from its rest to its winding positions, when said locking lever in its first position locks said second lever, said rack gear which meshes with said first gear pivots said first lever in a manner that said first lever positively maintains the meshing engagement between said first gear and said rack gear.

5. The camera according to claim 2, further including a double-exposure-preventing lever pivotally mounted on the camera and in engagement with said operating lever to be thereby pivotally moved when said operating lever is moved to its second position, an axially movable shutter release button shaft on the camera for releasing the camera shutter, said preventing member being movable into and out of the axis of said button shaft so as to prevent the movement thereof which would release the shutter, so as to permit the release movement thereof when said operating lever is moved from its first to its second position.

6. A filmstrip metering device for a camera having a camera body housing a filmstrip having a single perforation for each frame thereof, the device including:
- a wind-up member movable from a rest position to a film wind-up position;
- a rotatable wind-up gear coupled with the filmstrip for winding up the filmstrip upon rotation of said gear;
- a sensing member movably mounted on the camera body;
- means resiliently urging said sensing member into engagement with the filmstrip, said sensing member being movable from a retracted position engaging said filmstrip through an extended position extending into one of said perforations and to a metering position moved a predetermined amount from said extended position as the filmstrip is being wound;
- a locking lever operatively coupled with said sensing member for movement from an active position to an inactive position in response to the movement of said sensing member from its extended to its metering position;
- means for transmitting the movement of said wind-up member toward its wind-up position to said wind-up gear for rotating same; the improvement comprising:
- said transmitting means including a rotatable first gear engageable with said wind-up member;
- first biasing means for urging said first gear into engagement with said wind-up member so that said first gear is rotated by the movement of said wind-up member toward its wind-up position;
- a first lever rotatably supporting said first gear and being pivotable from a first position to a second position respectively disengaging and engaging said first gear from and with said wind-up member;
- a shaft mounted on the camera body;
- a second lever mounted on said shaft for pivotal movement from a first position to a second position respectively disengaged from and engaged with said locking lever when in its active position;
- an intermediate gear mounted for rotation on said shaft and being operatively coupled with said wind-up gear for rotating same, said intermediate gear being maintained non-rotatable by a load exerted thereon from the filmstrip through said wind-up gear until a wind-up force greater than said load is exerted thereon from said wind-up member; and
- a second gear engaged with said first and intermediate gears and being rotatably supported on said first and second levers,
- whereby said second gear is moved along said intermediate gear due to the rotation of said first gear for pivoting said first and second levers from their first to their second positions, and when having reached their second positions, said first and second levers are maintained stationary relative to the camera body, so that said load exerted on said intermediate gear is likewise exerted on said first gear through said second gear to completely engage said first gear with said wind-up member, and whereby said wind-up force is exerted from said wind-up member on said intermediate gear through said first and second gears to rotate said intermediate gear for a film wind-up operation, and said second gear is further movable along said intermediate gear due to the rotation of said first gear when said locking lever is moved to its inactive position to be disengaged from said second lever, and said first and second levers being further movable to a third position due to the further movement of said second gear so that said first gear is disengaged from said wind-up member.

7. The device according to claim 6, further comprising a stopper element mounted on the camera body and engageable with said first lever, said first lever being disengaged from said stopper element when in said first position and engaged with said stopper element when in said second position.

8. The device according to claim 7, further including second biasing means for urging said second member to its first position, the biasing force of said second biasing means being too small to return said second member to its first position against its movement to its second and third position.

9. The device according to claim 8, further including:
a shutter;
a release member for releasing said shutter;
an operating lever biased from a first position to a second position respectively disengaged from and engaged with said locking lever when in its inactive position;
a cocking member movable from its rest position to its cocked position for charging said shutter in response to the movement of said wind-up member toward its winding-up position, and moveable from its cocked position to its rest position in response to the release of said shutter;

means for retracting said sensing member from said metering position in response to the movement of said wind-up member to its rest position;
third biasing means for urging said locking lever to its inactive position; and
means for shifting said operating lever to its first position against its bias in response to the movement of said cocking member to its rest position, for disengaging said operating lever from said locking lever to permit said locking lever to return to its active position under the biasing force of said third biasing means.

10. The device according to claim 7, wherein said wind-up member includes a rack gear engageable with said first gear.

11. The device according to claim 7, wherein said camera body is adapted so that a film cartridge containing said filmstrip and incorporating said wind-up gear may be loaded therein, said wind-up gear being operatively coupled with said intermediate gear when said film cartridge is loaded in said camera body.

* * * * *